United States Patent
Plass et al.

(10) Patent No.: US 12,049,301 B2
(45) Date of Patent: Jul. 30, 2024

(54) SYSTEMS AND METHODS FOR OVERRIDING AUTONOMOUS CONTROL OF A DEVICE

(71) Applicant: The Boeing Company, Chicago, IL (US)

(72) Inventors: Christopher E. Plass, Chicago, IL (US); Kevin S. Callahan, Chicago, IL (US)

(73) Assignee: The Boeing Company, Arlington, VA (US)

( * ) Notice: Subject to any disclaimer, the term of this patent is extended or adjusted under 35 U.S.C. 154(b) by 10 days.

(21) Appl. No.: 17/533,237

(22) Filed: Nov. 23, 2021

(65) Prior Publication Data

US 2022/0194561 A1 Jun. 23, 2022

Related U.S. Application Data

(60) Provisional application No. 63/126,774, filed on Dec. 17, 2020.

(51) Int. Cl.
*G05G 11/00* (2006.01)
*B64C 19/00* (2006.01)

(52) U.S. Cl.
CPC .............. *B64C 19/00* (2013.01); *G05G 11/00* (2013.01)

(58) Field of Classification Search
CPC ....... G05G 11/00; B64C 13/22; B64C 13/343; B64C 19/00; B64C 19/02
See application file for complete search history.

(56) References Cited

U.S. PATENT DOCUMENTS

| | | | | |
|---|---|---|---|---|
| 3,199,811 A | * | 8/1965 | Brainerd | B64D 31/06 244/76 R |
| 5,277,024 A | * | 1/1994 | Bissey | F02C 9/28 60/39.281 |
| 7,044,024 B1 | | 5/2006 | Younkin | |
| 7,624,943 B2 | * | 12/2009 | Cerchie | B64C 13/22 244/17.11 |
| 7,784,741 B2 | * | 8/2010 | Cerchie | B64C 13/22 244/17.11 |
| 8,052,096 B2 | * | 11/2011 | Cerchie | B64C 13/22 244/17.11 |
| 9,366,296 B2 | | 6/2016 | Abrudan et al. | |
| 10,137,999 B2 | | 11/2018 | Nelson et al. | |

(Continued)

FOREIGN PATENT DOCUMENTS

| | | |
|---|---|---|
| EP | 1 996 459 A2 | 12/2008 |
| EP | 2 805 887 A2 | 11/2014 |

(Continued)

OTHER PUBLICATIONS

Extended European Search Report prepared by the European Patent Office in application No. EP 21 21 0107.5 dated Apr. 21, 2022.

*Primary Examiner* — Philip J Bonzell
(74) *Attorney, Agent, or Firm* — McDonnnell Boehnen Hulbert & Berghoff LLP

(57) ABSTRACT

Within examples, a system is described that includes a control lever for controlling operation of a device, a first actuator coupled to the control lever via a rod, and a resettable frangible link coupling a second actuator to the control lever via the rod. The resettable frangible link enables separation of coupling of the second actuator from the control lever based on an applied force to the rod by the first actuator.

20 Claims, 7 Drawing Sheets

(56) References Cited

U.S. PATENT DOCUMENTS

| | | |
|---|---|---|
| 10,265,760 B2 | 4/2019 | Dixon et al. |
| 10,329,008 B2 | 6/2019 | Walker et al. |
| 10,458,443 B2 | 10/2019 | Callahan et al. |
| 10,556,266 B2 | 2/2020 | Dixon et al. |
| 2007/0221782 A1* | 9/2007 | Cerchie .................. B64C 13/22 244/75.1 |
| 2009/0045296 A1* | 2/2009 | Cerchie ................ B64C 13/506 244/76 R |
| 2010/0286847 A1* | 11/2010 | Cerchie .................. B64C 13/22 701/2 |
| 2015/0198204 A1 | 7/2015 | Abrudan et al. |
| 2017/0284427 A1 | 10/2017 | Callahan et al. |
| 2020/0011355 A1 | 1/2020 | Callahan et al. |
| 2020/0180751 A1 | 6/2020 | Callahan et al. |

FOREIGN PATENT DOCUMENTS

| | | |
|---|---|---|
| EP | 2 905 497 A2 | 8/2015 |
| EP | 3 521 157 A1 | 8/2019 |

\* cited by examiner

SYSTEMS AND METHODS FOR OVERRIDING AUTONOMOUS CONTROL OF A DEVICE

CROSS REFERENCE TO RELATED APPLICATION

The present disclosure claims priority to U.S. provisional application No. 63/126,774, filed on Dec. 17, 2020, the entire disclosure of which is herein incorporated by reference.

FIELD

The present disclosure relates generally to methods to override autonomous control of a device, and more particularly, to a resettable frangible link that enables physical separation of autonomous control actuators from control levers based on an applied force.

BACKGROUND

Control systems are often commanded by either an automated actuator (in autonomous mode) or an operator (in manual mode). In some instances, the operator desires to override the automated actuator, and thus, needs an ability to regain control of inputs to the control system. In some instances, the control system includes two separate controls with one control for the human operator and another control for the autonomous control system.

In such examples, the human operator needs to have an ability to override the autonomous control, and it would be preferable to be able to return the control system to autonomous control capability once any human interaction has ended.

SUMMARY

In an example, a system is described comprising a control lever for controlling operation of a device, a first actuator coupled to the control lever via a rod, and a resettable frangible link coupling a second actuator to the control lever via the rod. The resettable frangible link enables separation of coupling of the second actuator from the control lever based on an applied force to the rod by the first actuator.

In another example, an aircraft is described comprising an engine, and a system coupled to the engine. The system comprises a control lever for controlling operation of the engine, a first actuator coupled to the control lever via a rod, and a resettable frangible link coupling a second actuator to the control lever via the rod. The resettable frangible link enables separation of coupling of the second actuator from the control lever based on an applied force to the rod by the first actuator. During autonomous operation mode of the engine, the second actuator is used to control the control lever of the engine. During manual operation mode of the engine, the first actuator is used by an operator to control the control lever of the engine. The manual operation mode is entered by the rod receiving the applied force by the first actuator causing the resettable frangible link to separate the second actuator from the rod.

In another example, a method for overriding autonomous control of a device is described. The method comprises controlling a control lever of a device via a first actuator during manual operation mode of the device. The first actuator is coupled to the control lever via a rod. The method also includes controlling the control lever of the device via a second actuator during autonomous operation mode of the device. A resettable frangible link couples the second actuator to the control lever via a rod. The method also includes entering the manual operation mode by the rod receiving an applied force via the first actuator causing the resettable frangible link to separate the second actuator from the rod.

The features, functions, and advantages that have been discussed can be achieved independently in various examples or combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples are described and should not be construed as limited to the examples set forth herein. Rather, these examples are described so that this disclosure will be thorough and complete and will fully convey the scope of the disclosure to those skilled in the art.

Within examples, a mechanically breakable control actuation device and system is described. The system allows for two separate control actuators to be used for a single controlled device, which is seen in many scenarios for redundant (primary and secondary) backup control mechanisms. For example, a throttle for an aircraft has a control rod for the pilot to use to control the throttle and another control rod that is controlled by a computer for autonomous flight. In this example, when there are two independent control mechanisms, there is a need to have an ability for one control to override the other (e.g., the pilot can override the computer control when needed). The examples herein allow the ability to disconnect (or temporally disable) one control actuator at various angles, and reconnect or reset the control actuator easily.

Figure 1:
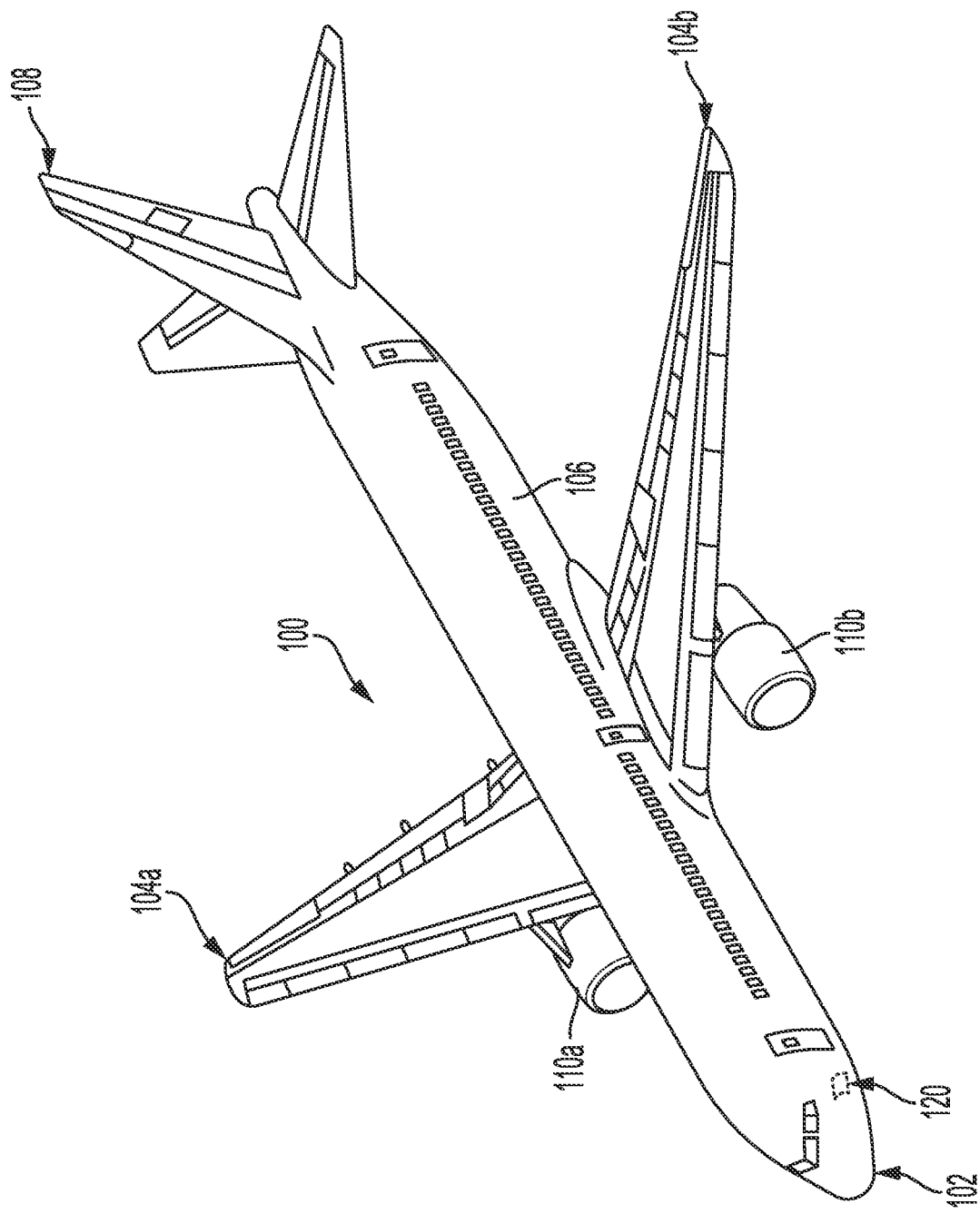
FIG. 1 illustrates an aircraft, according to an example implementation.

Referring now to the figures, FIG. 1 illustrates an aircraft 100, according to an example implementation. The aircraft 100 includes a nose 102, wings 104*a-b*, a fuselage 106, a tail 108, engines 110*a-b*, and a system 120 coupled to the engines 110a-b. In examples, the system 120 is utilized for overriding autonomous control of one or more of the engines 110a-b. Although FIG. 1 illustrates an example of a commercial passenger aircraft, other types of aircraft are used with examples described herein. In addition, depending on the type of aircraft fewer or more engines are included.

Figure 2:
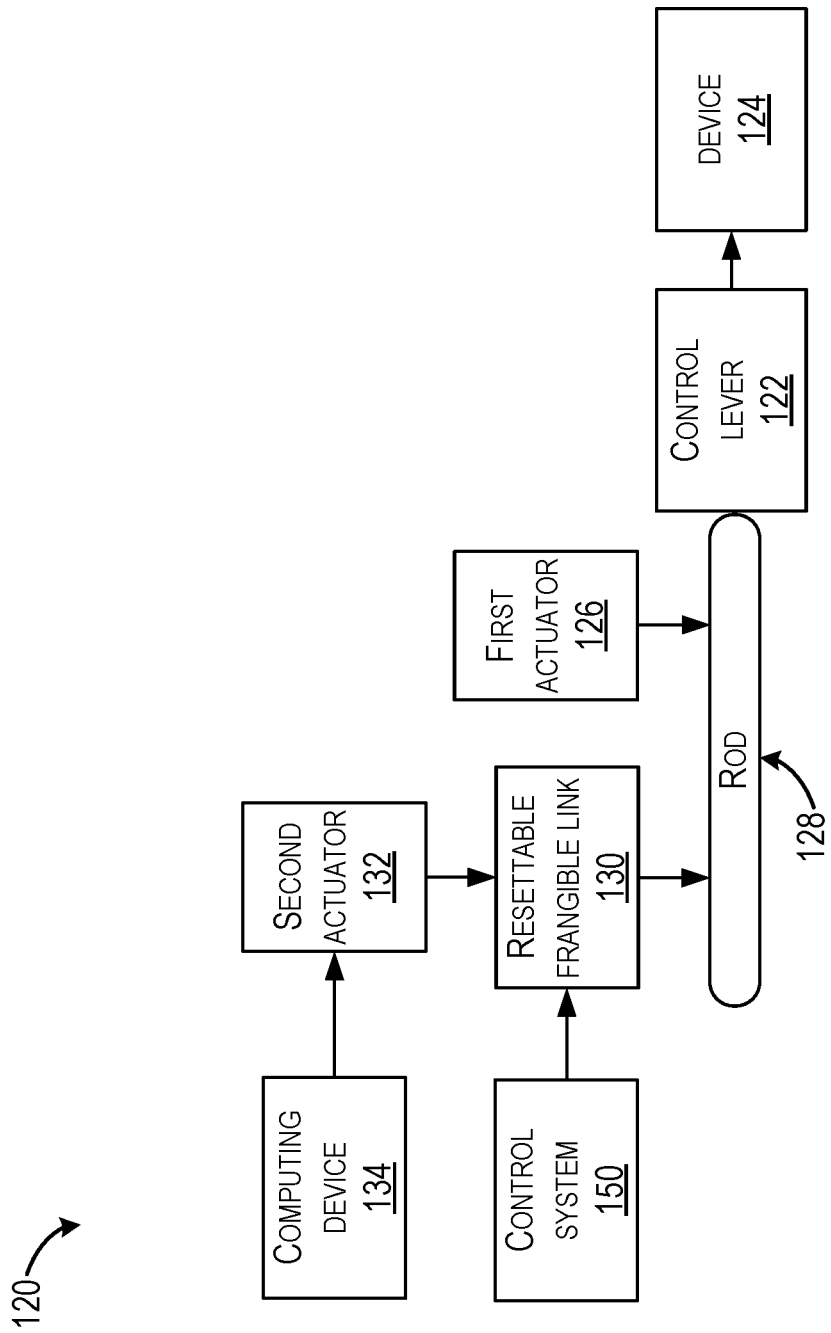
FIG. 2 illustrates a block diagram of an example of the system, according to an example implementation.

FIG. 2 illustrates a block diagram of an example of the system 120, according to an example implementation. The system 120 includes a control lever 122 for controlling operation of a device 124, a first actuator 126 coupled to the control lever 122 via a rod 128, and a resettable frangible link 130 coupling a second actuator 132 to the control lever 122 via the rod 128. The resettable frangible link 130 enables separation of coupling of the second actuator 132 from the control lever 122 based on an applied force to the rod 128 by the first actuator 126.

In an example, the control lever 122 controls operation of the device 124 using a bell crank movement. Thus, the control lever 122 is mechanically connected to the device 124, and rotation of the control lever 122 controls operation of the device 124. In examples, the device 124 includes any type of machine operated in this manner.

In an example application, the control lever 122 can include a throttle lever of the aircraft 100, for example, and the device 124 can be an engine coupled to the throttle lever. In this example, operation of the first actuator 126 or the second actuator 132 controls operation of the engine. For instance, the first actuator 126 is a control rod for a pilot to use to control the throttle lever, and the second actuator 132 is another control rod that is controlled by a computing device 134 for autonomous operation.

In another example operation, the control lever 122 controls other aircraft flight controls, such as pitch, roll, and yaw, for example.

The first actuator 126 is permanently attached to the control lever 122 via the rod 128. The second actuator 132 is removably attached to the control lever 122 via the resettable frangible link 130. The first actuator 126 and the second actuator 132 each have an ability for independent control of the control lever 122, and based on the applied force to the rod 128 by the first actuator 126, the first actuator 126 overrides the second actuator 132. When the first actuator 126 overrides the second actuator 132, the second actuator 132 is disconnected from the control lever 122. The first actuator 126 is always mechanically connected to the control lever 122, and so an operator always has an opportunity to take over control of the device 124.

The resettable frangible link 130 enables separation of coupling of the second actuator 132 from the control lever 122 at any rotational orientation of the control lever 122 with respect to the device 124.

Within examples, during autonomous operation mode of the device 124, the second actuator 132 is used to control the control lever 122 of the device 124, and during manual operation mode of the device 124, the first actuator 126 is used by an operator to control the control lever 122 of the device 124. The manual operation mode is entered by the rod 128 receiving the applied force by the first actuator 126 causing the resettable frangible link 130 to separate the second actuator 132 from the rod 128.

Generally, the second actuator 132 controls operation of the device 124 via movement of the control lever 122 according to programmed operation dictated by the computing device 134. The second actuator 132 enables autonomous control of the device 124. In some instances, the second actuator 132 can enter a failed state, in which cases the operator is able to regain control of the device 124 using the first actuator 126. To do so, however, the second actuator 132 will need to be disconnected from the control lever 122 so that the second actuator 132 no longer has an ability to control the control lever 122. The system 120 is configured such that an application of a force to the first actuator 126 causes the rod 128 to break free of the second actuator 132. The breaking point in the system 120 is the resettable frangible link 130 that breaks and disconnects the second actuator 132 from the rod 128, which mechanically disconnects the second actuator 132 from the control lever 122 leaving the first actuator 126 as the only actuator connected to the control lever 122 for control of the device 124.

The breakaway characteristics can be tightly controlled to prevent erroneous fusing during normal operation and ensure complete fusing when necessary at any control input position. The system 120 is not prone to early fatigue failures, does not interfere with other systems when fused, and is resettable once a fault has been cleared.

The system 120 allows safe separation of a failed device (e.g., engine of autonomously controlled vehicle or flight controls actuator). In an example use, a single engine aircraft includes a single operator throttle cable that attaches to a throttle lever of the engine. During autonomous mode of operation, a throttle actuator is used to control the throttle lever on the engine, backdriving the throttle cable and control lever in a cabin of the aircraft. During piloted mode, the pilot drives the throttle cable with the lever in the cabin, and the actuator is backdriven. In the event the throttle actuator jams or does not release control when requested, the pilot is able to command throttle movement through the cable, breaking free of the throttle actuator. The resettable frangible link 130 that attaches the second actuator 132 (e.g., autonomous throttle actuator) to the engine-mounted throttle lever (e.g., control lever 122) will allow safe throttle operation in either mode, and will break free in an event where the autonomous throttle actuator has failed and the pilot must move the throttle. The resettable frangible link 130 is also be resettable when the fault has been cleared.

The system 120 thus provides aircraft with two separate controls. One control is by the human pilot (e.g., the first actuator 126) and the other control is the autonomous control (e.g., second actuator 132). The first actuator 126 and the second actuator 132 work in tandem during autonomous control. The first actuator 126 has the ability to override the autonomous control, and is able to return to autonomous control once a situation has returned to normal.

Figure 3:
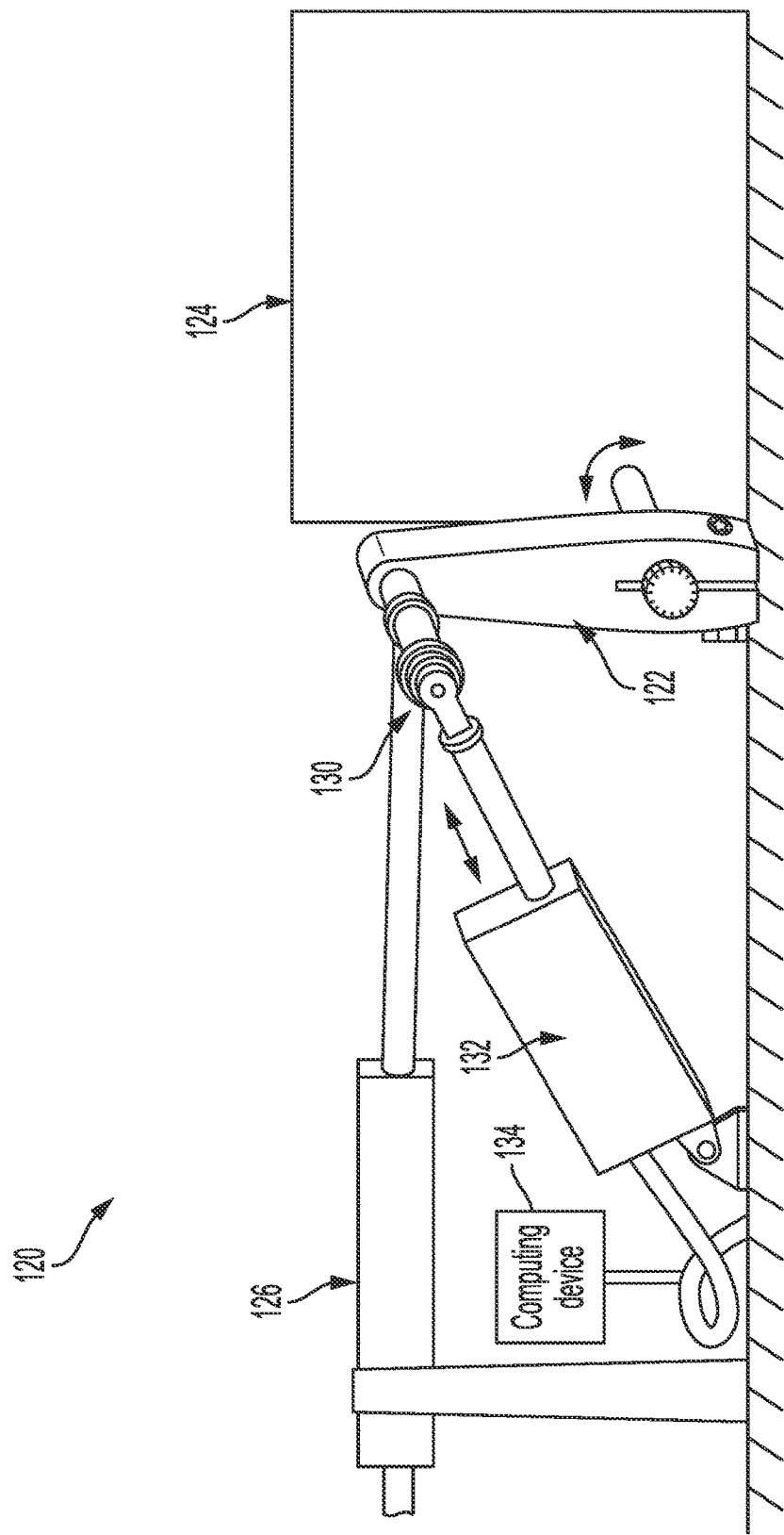
FIG. 3 illustrates a side view of an example of the system, according to an example implementation.

FIG. 3 illustrates a side view of an example of the system 120, according to an example implementation. The first actuator 126 and the second actuator 132 are operated in a linear motion to cause rotation of the control lever 122, as shown, for a rotary input to the device 124.

Figure 4:
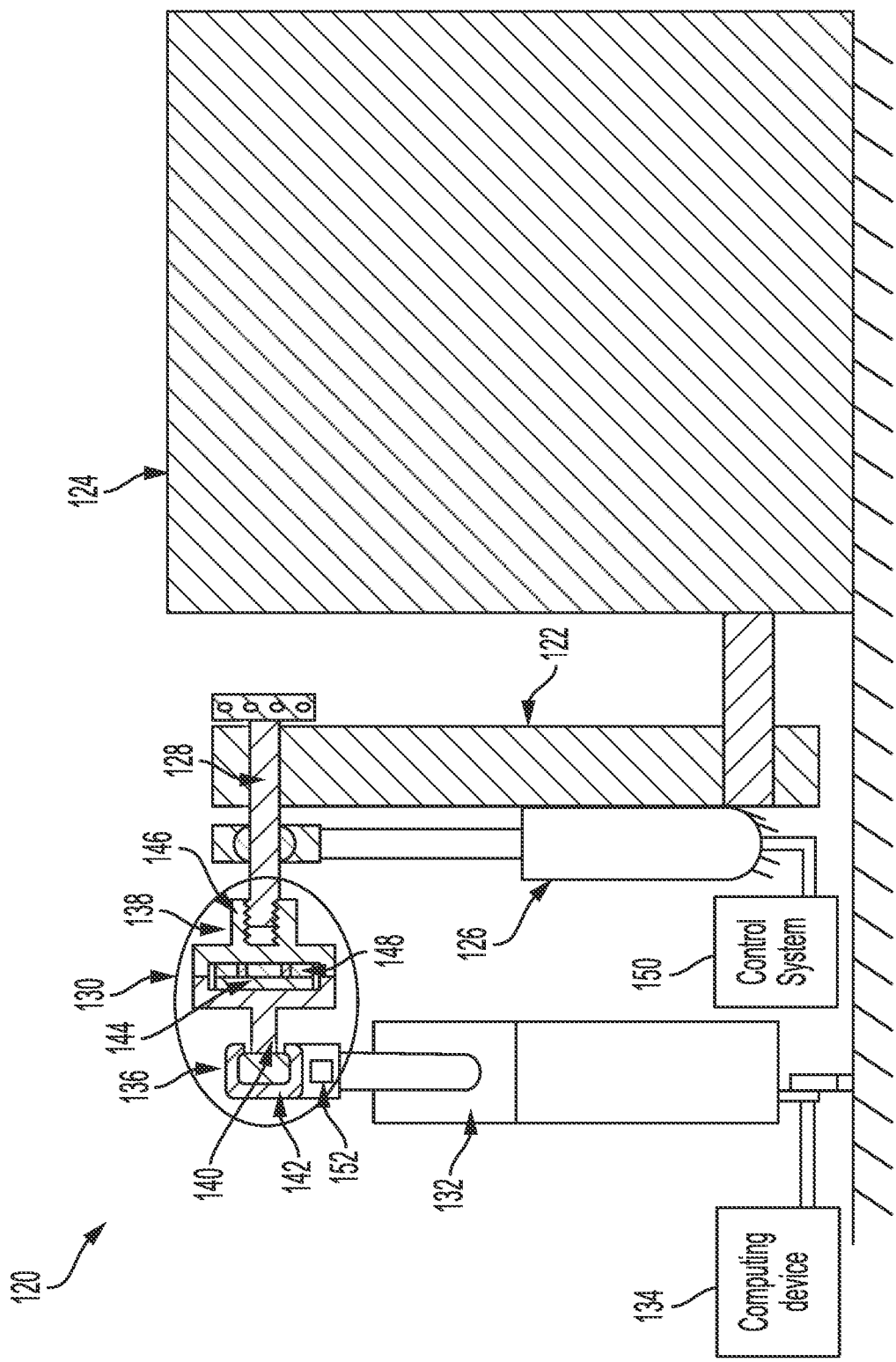
FIG. 4 illustrates a front view of an example of the system, according to an example implementation.

FIG. 4 illustrates a front view of an example of the system 120, according to an example implementation. FIG. 4 illustrates further details of the resettable frangible link 130 and the rod 128. Within examples, the resettable frangible link 130 includes a magnetically or a mechanically frangible control rod link.

In FIG. 4, the resettable frangible link 130 includes a magnetic coupling having a first half 136 and a second half 138 to couple the second actuator 132 to the control lever 122 via the rod 128. The first half 136 includes a base 140 for mating with a fitting 142 of the second actuator 132. The base 140 can include a ball-type quick attach fitting and the fitting 142 can include a socket into which the ball-type quick attach fitting is inserted. The first half 136 also includes a magnet 144 positioned in the base 140. The second half 138 includes a brace 146 attached to the rod 128, and a magnetic pole piece 148 positioned in the brace 146. The magnet 144 is magnetically connected to the magnetic pole piece 148. The brace 146 includes a threaded portion for attaching to corresponding threads on the rod 128, and the magnetic pole piece 148 is connected to the brace 146 using a screw attachment, for example.

In operation, when the first actuator 126 and the second actuator 132 both pull the control lever 122, the resettable frangible link 130 will break under an induced bending load. For example, a magnetic force between the magnet 144 and the magnetic pole piece 148 will be overcome by the induced bending load. The second actuator 132 is then disconnected from the control lever 122 and the device 124 is operated using the first actuator 126.

The base 140 is shown as oval to enable a breakaway at different forces (or force amounts) depending on any angle. The breakaway force may be lower at higher angles (e.g., as the fitting 142 tilts relative to the base 140). The control lever 122 moves through an arc having a wide angle of rotation (e.g., 90 degrees or more), and thus, the resettable frangible link 130 allows for breakaway of the second actuator 132 at any orientation and at the same amount of applied force.

In other examples, the base 140 includes a footprint shape such that breakaway forces vary with output shaft angle and produce a constant force acting normal to the control lever 122, thus, helping to ensure a constant output shaft torque regardless of shaft angular position. For example, with the base 140 in a round shape, a frangible force to break is always the same.

The resettable frangible link 130 is not required to be in line with the rod 128 (axially, or in plane). This allows for many options for mounting hardware, and can be accomplished by the base 140 being the ball and socket type configuration, where the base 140 is round and the fitting 142 mating surface is a matching round hole. Using the magnet 144 for the connection allows for easy disconnect and quick resetting of the resettable frangible link 130. The magnet 144 and the base 140 profile also allows for a precise control of a break point load. The shape of the base 140 can be altered from circular to adjust the break point load too.

Thus, the system 120 is resettable and is configured to break within a prescribed applied force. The breakaway force is predictable and consistent. The breakaway force is also abrupt such that there is no intermediate break position that is achieved. Thus, either the first actuator 126 or the second actuator 132 is in control of the control lever 122. There is not a scenario where both the first actuator 126 and the second actuator 132 are in control of the control lever 122. Once the breakaway force is achieved, the second actuator 132 is disconnected abruptly.

The magnet 144 enables the resettable frangible link 130 to break consistently with the same torque, and can be easily reset by realigning the magnet 144 with the magnetic pole piece 148.

In some examples, the magnet 144 is a permanent magnet.

In some examples, the magnet is an electro-magnet, and the system 120 further includes a control system 150 coupled to the electro-magnet for controlling a magnetic attraction force of the electro-magnet. In FIG. 4, the control system 150 is shown coupled to a base of the first actuator 126 and wiring coupling to the magnet 144 and/or the magnetic pole piece 148 is internal to the first actuator 126. The first actuator 126 is always connected to the rod 128, and thus, an electrical connection between the magnet 144 and the control system 150 is always in place.

The control system 150 includes a processor, memory, and instructions stored on the memory executable by the processor to perform functions. For example, the control system 150 can be programmed to alter the magnetic attraction force of the electro-magnet based on an operating condition of the device 124. The control system 150 can alter the magnetic force to vary a separation or break-away force that is required. In a scenario where the device 124 is an engine on an aircraft, during an approach for landing turbulence can be high, and thus, the control system 150 in this scenario alters the magnetic force to be stronger to prevent an undesired break-away caused by turbulence. Thus, a stage of flight can be used as a basis for the control system 150 to alter the magnetic force of the magnet 144 by increasing, decreasing, or otherwise changing an amount of power provided to the electro-magnet.

In another example, the control system 150 alters the magnetic force of the electro-magnet based on weather conditions in which the device 124 operates. The control system 150 can be programmed to alter the magnetic force of the electro-magnet based on any combination of factors described herein too.

In another example, the control system 150 alters the magnetic force of the electro-magnet to tailor a positional angled break away force required. In this example, a sensor 152 is included for detecting an angle of the resettable frangible link 130 with respect to the second actuator 132, and the control system 150 alters the magnetic attraction force based on the angle. The control system 150 and electro-magnet can thus produce customized break away forces with respect to angle, as sensed by the positional sensor, which outputs signals to the control system 150 in a feedback loop to control force in position and time.

Figure 5:
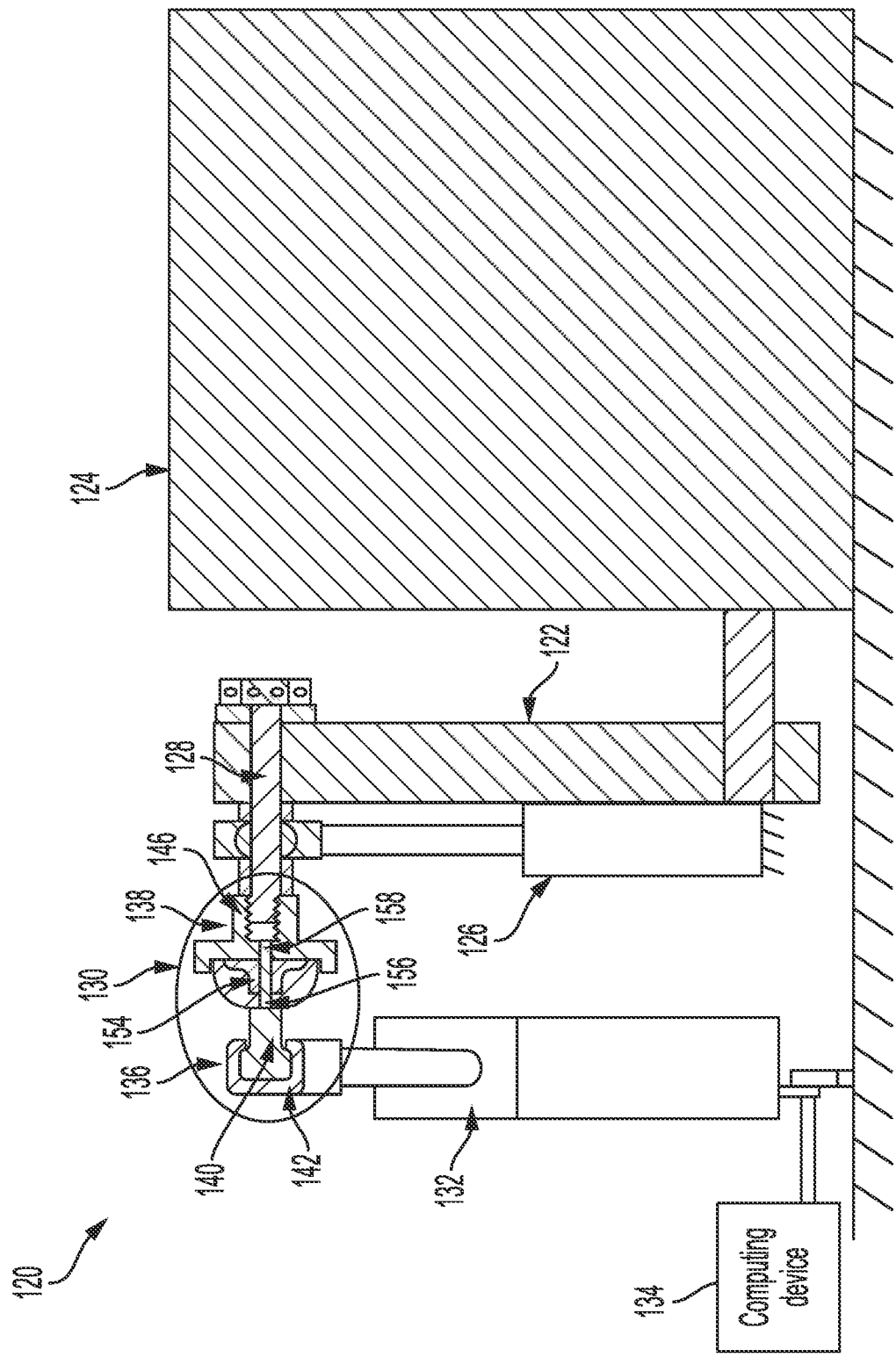
FIG. 5 illustrates a front view of another example of the system, according to an example implementation.

FIG. 5 illustrates a front view of another example of the system 120, according to an example implementation. In FIG. 5, the resettable frangible link 130 a mechanically frangible control rod 154 to couple the second actuator 132 to the control lever 122 via the rod 128. The first half 136 still includes the base 140 for mating with the fitting 142 of the second actuator 132, and the second half 138 includes the brace 146 attached to the rod 128. The mechanically frangible control rod 154 connects the first half 136 to the second half 138.

The mechanically frangible control rod 154 has a first end 156 and a second end 158, and each of the first end 156 and the second end 158 is threaded such that the first end 156 attaches to the base 140 and the second end 158 attaches to the brace 146.

In operation, when the first actuator 126 applies a force to the rod 128, the mechanically frangible control rod 154 will break, based on the force being above a threshold amount, and the second actuator 132 will then be disconnected from the control lever 122.

In one example, the mechanically frangible control rod 154 is a tensile element. The mechanically frangible control rod 154 has a predefined preload and will break under a certain applied pressure. To reset the resettable frangible link 130, the broken fragments of the mechanically frangible control rod are unscrewed from both sides (e.g., from the base 140 and from the brace 146), and a new tensile element is inserted.

Figure 6:
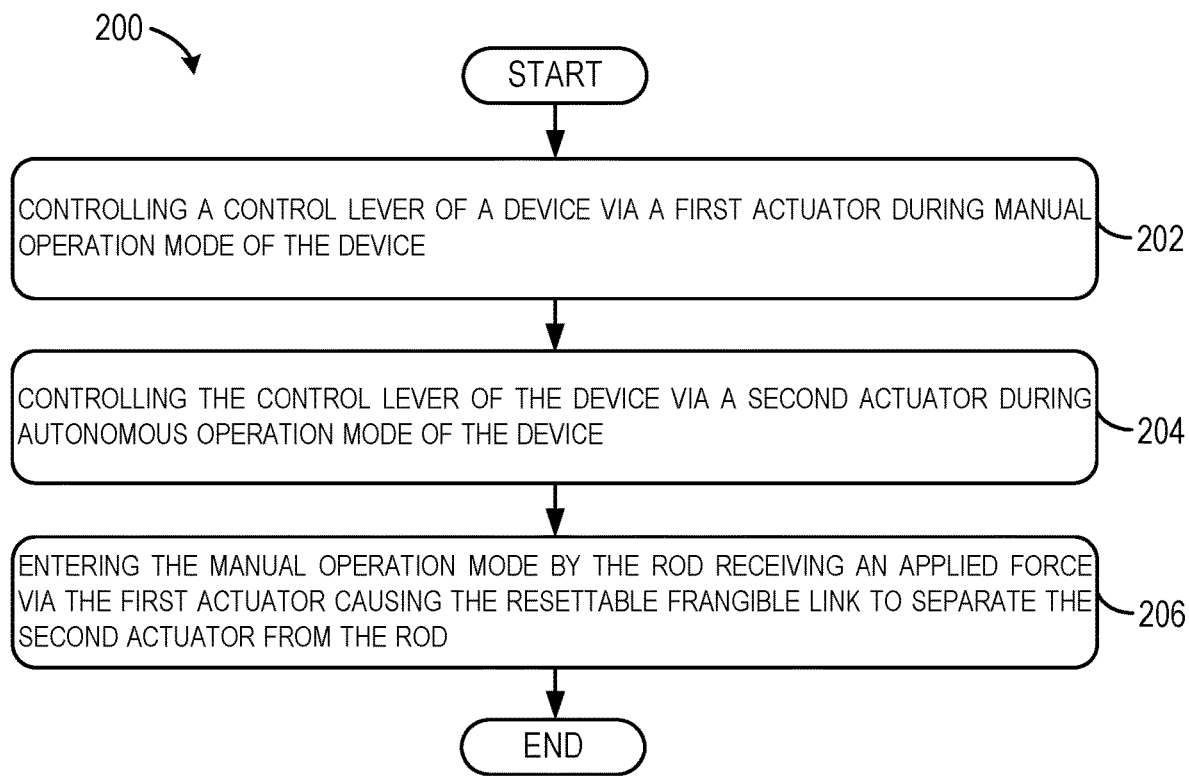
FIG. 6 shows a flowchart of an example of a method 200 for overriding autonomous control of the device, according to an example implementation.

FIG. 6 shows a flowchart of an example of a method 200 for overriding autonomous control of the device 124, according to an example implementation. Method 200 shown in FIG. 6 presents an example of a method that could be used with the aircraft 100 shown in FIG. 1, with the system 120 shown in FIGS. 2-5, or with the computing device 134 shown in FIG. 7, for example. Further, devices or systems are used or configured to perform logical functions presented in FIG. 6. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 200 includes one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code is be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes controlling the control lever 122 of the device 124 via the first actuator 126 during manual operation mode of the device 124, and the first actuator 126 is coupled to the control lever 122 via the rod 128.

At block 204, the method 200 includes controlling the control lever 122 of the device 124 via the second actuator 132 during autonomous operation mode of the device 124, and the resettable frangible link 130 couples the second actuator 132 to the control lever 122 via the rod 128.

At block 206, the method 200 includes entering the manual operation mode by the rod 128 receiving an applied force via the first actuator 126 causing the resettable frangible link 130 to separate the second actuator 132 from the rod 128.

Within an example, the resettable frangible link 130 includes a magnetic coupling having the first half 136 and the second half 138 to couple the second actuator 132 to the control lever 122 via the rod 128, and the method 200 further includes realigning the first half 136 and the second half 138 of the magnetic coupling causing a magnetic attachment of the first half 136 and the second half 138 in order to reattach the second actuator 132 to the rod 128 for reentering the autonomous operation mode of the device 124. In an example, the realignment is performed by a manual attachment. In another example, the realignment occurs by magnetic reattachment of the magnet 144 to the magnetic pole piece 148.

Figure 7:
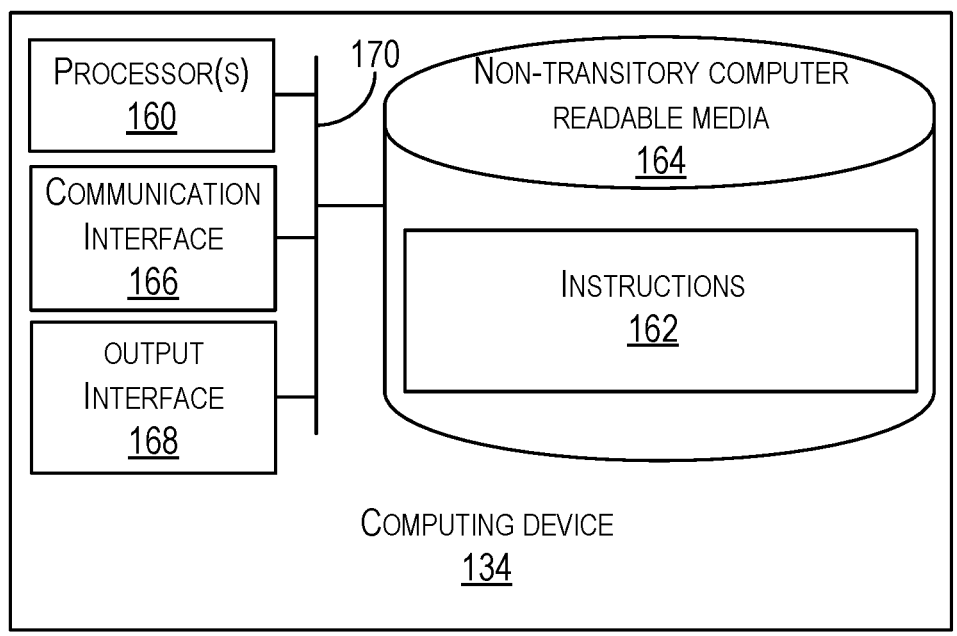
FIG. 7 illustrates an example of the computing device, according to an example implementation.

In FIGS. 2-5, the system 120 is shown to include a computing device 134. In examples, the control system 150 takes the form of a computing device too. FIG. 7 illustrates an example of the computing device 134, according to an example implementation.

To perform the functions described, the computing device 134 includes one or more processors 160, instructions 162 stored on non-transitory computer readable media 164, a communication interface 166, an output interface 168, and each component of the computing device 134 is connected to a communication bus 170. The computing device 134 also includes hardware to enable communication within the computing device 134 and between the computing device 134 and other devices (not shown). The hardware may include transmitters, receivers, and antennas, for example.

In examples, the communication interface 166 is a wireless interface and/or one or more wireline interfaces that allow for both short-range communication and long-range communication to one or more networks or to one or more remote devices. Such wireless interfaces provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, in examples, the communication interface 166 is configured to receive input data from one or more devices, and is also configured to send output data to other devices.

The non-transitory computer readable media 164 includes or take the form of memory, such as one or more computer-readable storage media that can be read or accessed by the one or more processors 160. The computer-readable storage media can include volatile and/or non-volatile storage components, such as optical, magnetic, organic or other memory or disc storage, which can be integrated in whole or in part with the one or more processors 160. The non-transitory computer readable media 164 is considered non-transitory computer readable media. In some examples, the non-transitory computer readable media 164 can be implemented using a single physical device (e.g., one optical, magnetic, organic or other memory or disc storage unit), while in other examples, the non-transitory computer readable media 164 can be implemented using two or more physical devices.

The non-transitory computer readable media 164 thus is a computer readable medium, and the instructions 162 are stored thereon. The instructions 162 include computer executable code.

In examples, the one or more processors 160 are general-purpose processors or special purpose processors (e.g., digital signal processors, application specific integrated circuits, etc.). The one or more processors 160 receive inputs from the communication interface 166 as well as outputs from other sensors (e.g., the sensor 152), and process them to generate outputs that are stored in the non-transitory computer readable media 164. The one or more processors 160 can be configured to execute the instructions 162 (e.g., computer-readable program instructions) that are stored in the non-transitory computer readable media 164 and are executable to provide the functionality of the computing device 134 described herein.

The output interface 168 outputs information for reporting or storage, and thus, the output interface 168 is similar to the communication interface 166 and can be a wireless interface (e.g., transmitter) or a wired interface as well.

Note that although this disclosure has described use of the methods and systems for use on aircraft, the same functions apply equally to use of the methods and system on board any type of vehicle in order to change from an autonomous to a manual mode of operation. The methods and systems can also find use within non-vehicles or stationary areas to change operation of any type of machine.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
    a control lever for controlling operation of a device;
    a first actuator coupled to the control lever via a rod; and
    a resettable frangible link coupling a second actuator to the control lever via the rod, wherein the resettable frangible link enables separation of coupling of the second actuator from the control lever based on an applied force to the rod by the first actuator.

2. The system of claim 1, wherein the control lever controls operation of the device using a bell crank movement.

3. The system of claim 1, wherein the control lever is a throttle lever, and the device is an engine coupled to the throttle lever, wherein operation of the first actuator or the second actuator controls operation of the engine.

4. The system of claim 1, wherein the resettable frangible link enables separation of coupling of the second actuator from the control lever at any rotational orientation of the control lever with respect to the device.

5. The system of claim 1, wherein the control lever is a throttle lever for an aircraft, the first actuator is a control rod for a pilot to use to control the throttle lever, and the second actuator is another control rod that is controlled by a computing device for autonomous operation.

6. The system of claim 1, wherein the first actuator is permanently attached to the control lever via the rod.

7. The system of claim 1, wherein the first actuator and the second actuator each have an ability for independent control of the control lever, wherein based on the applied force to the rod by the first actuator, the first actuator overrides the second actuator.

8. The system of claim 1, wherein the resettable frangible link includes a mechanically frangible control rod to couple the second actuator to the control lever via the rod.

9. The system of claim 1, wherein the resettable frangible link comprises:
    a base for mating with a fitting of the second actuator;
    a brace attached to the rod; and
    a mechanically frangible control rod having a first end and a second end, and each of the first end and the second end is threaded such that the first end attaches to the base and the second end attaches to the brace.

10. The system of claim 1, wherein during autonomous operation mode of the device, the second actuator is used to control the control lever of the device, and wherein during manual operation mode of the device, the first actuator is used by an operator to control the control lever of the device, and
    wherein the manual operation mode is entered by the rod receiving the applied force by the first actuator causing the resettable frangible link to separate the second actuator from the rod.

11. The system of claim 10, wherein the resettable frangible link includes a magnetic coupling having a first half and a second half to couple the second actuator to the control lever via the rod, and the first half and the second half of the magnetic coupling are configurable to be realigned causing a magnetic attachment of the first half and the second half in order to reattach the second actuator to the rod for reentering the autonomous operation mode of the device.

12. The system of claim 1, wherein the resettable frangible link includes a magnetic coupling having a first half and a second half to couple the second actuator to the control lever via the rod.

13. The system of claim 12, wherein the magnet is a permanent magnet.

14. The system of claim 1, wherein the resettable frangible link comprises:
    a base for mating with a fitting of the second actuator;
    a magnet positioned in the base;
    a brace attached to the rod; and
    a magnetic pole piece positioned in the brace, wherein the magnet is magnetically connected to the magnetic pole piece.

15. The system of claim 14, wherein the brace includes a threaded portion for attaching to corresponding threads on the rod.

16. The system of claim 1, wherein the resettable frangible link includes an electro-magnet, and the system further comprises:
   a control system coupled to the electro-magnet for controlling a magnetic attraction force of the electro-magnet.

17. The system of claim 16, wherein the control system alters the magnetic attraction force based on an operating condition of the device.

18. The system of claim 16, further comprising a sensor for detecting an angle of the resettable frangible link with respect to the second actuator, and wherein the control system alters the magnetic attraction force based on the angle.

19. An aircraft, comprising:
   an engine;
   a system coupled to the engine, the system comprising:
      a control lever for controlling operation of the engine;
      a first actuator coupled to the control lever via a rod; and
      a resettable frangible link coupling a second actuator to the control lever via the rod, wherein the resettable frangible link enables separation of coupling of the second actuator from the control lever based on an applied force to the rod by the first actuator,
   wherein during autonomous operation mode of the engine, the second actuator is used to control the control lever of the engine,
   wherein during manual operation mode of the engine, the first actuator is used by an operator to control the control lever of the engine, and
   wherein the manual operation mode is entered by the rod receiving the applied force by the first actuator causing the resettable frangible link to separate the second actuator from the rod.

20. The aircraft of claim 19, wherein the resettable frangible link includes a magnetic coupling having a first half and a second half to couple the second actuator to the control lever via the rod, and the first half and the second half of the magnetic coupling are configurable to be realigned causing a magnetic attachment of the first half and the second half in order to reattach the second actuator to the rod for reentering the autonomous operation mode of the engine.

* * * * *